United States Patent [19]

Divine

[11] 4,028,679
[45] June 7, 1977

[54] MEMORY PATCHING CIRCUIT WITH INCREASED CAPABILITY

[75] Inventor: Charles Hamman Divine, Thornton, Colo.

[73] Assignee: Bell Telephone Laboratories, Incorporated, Murray Hill, N.J.

[22] Filed: Oct. 16, 1975

[21] Appl. No.: 622,938

[52] U.S. Cl. .......................................... 340/172.5
[51] Int. Cl.² ...................................... G06F 13/00
[58] Field of Search ............................. 340/172.5

[56] References Cited
UNITED STATES PATENTS 3,934,227  1/1976  Worst ............................. 340/172.5

Primary Examiner—Gareth D. Shaw
Assistant Examiner—C. T. Bartz
Attorney, Agent, or Firm—Donald M. Duft

[57] ABSTRACT

A read only memory (ROM) patching arrangement is disclosed for providing valid output information whenever defective ROM word locations containing invalid information are addressed. The disclosed arrangement, which includes a decoder comprising a plurality of small capacity PROMs, detects the receipt of each address word representing a defective location, temporarily inhibits the output of the ROM, and causes a small auxiliary memory to output valid information as a substitute for that in the defective ROM location. The patching capability of the auxiliary memory and the decoder PROMs is increased by extending n bits of each ROM address word to n inputs of the auxiliary memory as well as to n inputs of each decoder PROM. The remaining inputs of the decoder PROMs, taken collectively, each receive a different one of the remaining bits of each ROM address.

9 Claims, 9 Drawing Figures

FIG. 4

| PATCH NO. | ADDRESS BITS A3 A2 A1 A0 | PROM 1 OUTPUT BITS 7 6 5 4 3 2 1 0 |
|---|---|---|
| 0 | 0 0 1 0 | 0 0 0 0 0 0 0 1 |
| 1 | 0 1 0 0 | 0 0 0 0 0 0 1 0 |
| 2 | 1 0 0 0 | 0 0 0 0 1 1 0 0 |
| 3 | 1 0 0 0 | 0 0 0 0 1 1 0 0 |
| 4 | 1 0 1 0 | 0 0 0 1 0 0 0 0 |
| 5 | 1 1 1 0 | 0 0 1 0 0 0 0 0 |
| 6 | 0 1 1 0 | 0 1 0 0 0 0 0 0 |
| 7 | 1 1 0 0 | 1 0 0 0 0 0 0 0 |

FIG. 5

| PATCH NO. | ADDRESS BITS A7 A6 A5 A4 A0 | PROM 2 OUTPUT BITS 7 6 5 4 3 2 1 0 |
|---|---|---|
| 0 | 0 0 1 0 0 | 0 0 0 0 0 0 0 1 |
| 1 | 0 1 1 0 0 | 0 0 0 0 0 0 1 0 |
| 2 | 0 1 0 0 0 | 0 0 0 0 0 1 0 0 |
| 3 | 0 0 0 1 0 | 0 0 0 0 1 0 0 0 |
| 4 | 1 0 1 0 0 | 0 0 0 1 0 0 0 0 |
| 5 | 1 1 0 0 0 | 0 0 1 0 0 0 0 0 |
| 6 | 0 0 1 1 0 | 0 1 0 0 0 0 0 0 |
| 7 | 0 1 1 1 0 | 1 0 0 0 0 0 0 0 |

FIG. 6

| PATCH NO. | ADDRESS BITS A11 A10 A9 A8 A0 | PROM 3 OUTPUT BITS 7 6 5 4 3 2 1 0 |
|---|---|---|
| 0 | 0 1 0 0 0 | 0 0 0 0 0 0 0 1 |
| 1 | 1 1 0 0 0 | 0 0 0 0 0 0 1 0 |
| 2 | 1 0 0 0 0 | 0 0 0 0 0 1 0 0 |
| 3 | 0 0 1 0 0 | 0 0 0 0 1 0 0 0 |
| 4 | 0 1 0 1 0 | 0 0 0 1 0 0 0 0 |
| 5 | 1 0 0 1 0 | 0 0 1 0 0 0 0 0 |
| 6 | 0 1 1 0 0 | 0 1 0 0 0 0 0 0 |
| 7 | 1 1 1 1 0 | 1 0 0 0 0 0 0 0 |

FIG. 7

| PATCH NO. | ADDRESS BITS A3 A2 A1 A0 | PROM 1 OUTPUT BITS 7 6 5 4 3 2 1 0 |
|---|---|---|
| 8  | 0 0 0 1 | 0 0 0 0 0 0 0 1 |
| 9  | 0 1 0 1 | 0 0 0 0 0 0 1 0 |
| 10 | 1 0 0 1 | 0 0 0 0 0 1 0 0 |
| 11 | 0 0 1 1 | 0 0 0 0 1 0 0 0 |
| 12 | 1 1 1 1 | 0 0 0 1 0 0 0 0 |
| 13 | 1 0 1 1 | 0 0 1 0 0 0 0 0 |
| 14 | 0 1 1 1 | 0 1 0 0 0 0 0 0 |
| 15 | 1 1 0 1 | 1 0 0 0 0 0 0 0 |

FIG. 8

| PATCH NO. | ADDRESS BITS A7 A6 A5 A4 A0 | PROM 2 OUTPUT BITS 7 6 5 4 3 2 1 0 |
|---|---|---|
| 8  | 1 1 1 1 1 | 0 0 0 0 0 0 0 1 |
| 9  | 0 1 1 1 1 | 0 0 0 0 0 0 1 0 |
| 10 | 1 1 0 1 1 | 0 0 0 0 0 1 0 0 |
| 11 | 0 1 0 1 1 | 0 0 0 0 1 0 0 0 |
| 12 | 1 0 1 1 1 | 0 0 0 1 0 0 0 0 |
| 13 | 0 0 1 1 1 | 0 0 1 0 0 0 0 0 |
| 14 | 1 0 0 1 1 | 0 1 0 0 0 0 0 0 |
| 15 | 0 0 0 1 1 | 1 0 0 0 0 0 0 0 |

FIG. 9

| PATCH NO. | ADDRESS BITS A11 A10 A9 A8 A0 | PROM 3 OUTPUT BITS 7 6 5 4 3 2 1 0 |
|---|---|---|
| 8  | 1 1 0 1 1 | 0 0 0 0 0 0 0 1 |
| 9  | 1 1 1 1 1 | 0 0 0 0 0 0 1 0 |
| 10 | 1 0 0 1 1 | 0 0 0 0 0 1 0 0 |
| 11 | 1 0 1 1 1 | 0 0 0 0 1 0 0 0 |
| 12 | 0 1 0 1 1 | 0 0 0 1 0 0 0 0 |
| 13 | 0 1 1 1 1 | 0 0 1 0 0 0 0 0 |
| 14 | 0 0 0 1 1 | 0 1 0 0 0 0 0 0 |
| 15 | 1 1 1 1 1 | 1 0 0 0 0 0 0 0 |

MEMORY PATCHING CIRCUIT WITH INCREASED CAPABILITY

BACKGROUND OF THE INVENTION

1. Field of the Invention

This invention relates to a patching facility for unalterable memories of the type used in electronic computers and processors. More particularly, the invention relates to a memory patching facility which furnishes good output information whenever an attempt is made to access word locations containing defective or invalid information in an unalterable memory.

2. Description of the Prior Art

It is known to use unalterable read only memories (ROMs) in processors, computers, and other such applications requiring the storage of permanent type information. Although ROMs, in particular semiconductor ROMs, are efficient unalterable information storage devices, their use presents problems whenever it becomes necessary to change the stored information. For example, a machine using a ROM may be manufactured, tested, delivered, installed in service, and perform satisfactorily for an extended period of time. A machine malfunction may subsequently occur because of defective program information in the ROM. This defective information may be due either to a subtle defect in the program as originally written; or it may result from a newly developed defect within the ROM device.

In view of the above, it is a common problem for program errors to be discovered in ROM controlled machines and for the owner of the machine to be faced with the problem of promptly correcting the error to minimize the machine downtime.

This problem could be easily solved if the realities of semiconductor ROM technology and economics were of no concern. Conceivably, the probelm could be solved by replacing the defective ROM with a new ROM programmed with the correct information. However, this solution is neither feasible nor economical. First of all, the typical semiconductor ROM can only be programmed at the factory with the programming comprising a portion of the manufacturing process. Consequently, a machine user cannot promptly obtain a newly programmed ROM. Instead he must contact the ROM manufacturer, give the manufacturer the corrected program information, and then wait for the manufacturer to produce and deliver the new ROM. Also, because the ROM programming is done by the manufacturer on a customized basis, a manufacturer cannot economically produce one or two new ROMs for a single customer. ROMs are economical only when fabricated in reasonably large quantities. For these reasons, the downtime of a machine cannot normally be minimized by replacing a defective ROM with a new one having corrected program information.

Field programmable ROMs (PROMs) are commercially available for immediate delivery. Conceivably, an installed machine having a defective ROM could be returned to service by programming a PROM with good information, and by then replacing the defective ROM with the newly programmed PROM. This would be technically feasible, but economically unsatisfactory, for most applications. The reason for this is that PROM devices are approximately ten times the cost of comparable ROMs. This expedient might be satisfactory, in spite of the economic penalty, in installations where the cost of the PROM is low compared to the cost to the user of the down condition of the machine. However, many installations could not tolerate the cost penalty. For example, a telephone company or a computer manufacturer having thousands of machines in service possibly could not afford the mass replacement of defective ROMs with PROMs costing ten times as much.

Attempts have been made in the prior art to solve the problem of defective information in unalterable memories. Most of the prior art solutions require the use of equipment that is complicated and expensive, such as the provision of a fully duplicated memory system. One prior art arrangement comprises a decoder which detects the receipt of each memory address word specifying a defective ROM location, generates a control signal to inhibit the output of the defective ROM, and activates an alterable auxiliary memory which then supplies valid program information. A system of this type is shown in U.S. Pat. No. 3,638,194 issued on Jan. 25, 1972 to Matushita et al.

Matushita uses a diode matrix array as the auxiliary memory. This memory can be field programmed by inserting diodes into sockets of the matrix crosspoints required to generate the new program information. The Matushita system may be suitable for use in application where space is not at a premium and where the ROM is of limited capacity. However, it is unsuitable with present state of the art systems using integrated circuits including ROMs and other such devices of the postage stamp size where space is at a premium. Also, the Matushita arrangement would be costly for use with a large capacity ROM since the auxiliary memory presumably would have to have the same bit capacity as the defective ROM. In this case it would merely comprise another duplicated memory arrangement.

It is therefore, a problem to maintain program controlled machines in service when program defects are discovered in the ROMs of such machines.

SUMMARY OF THE INVENTION

Objects

An object of the invention is to provide memory patching facilities for stored program controlled machines using ROMs.

A further object is to provide memory patching facilities which are activated to output good information whenever ROM word locations containing defective information are addressed.

SUMMARY DESCRIPTION

The present invention comprises an improved patching facility for ROMs. The provided equipment includes a PROM decoder for detecting the receipt of address words representing defective ROM locations and for generating an output signal representing each such address word, a small capacity auxiliary memory for storing the valid program information that it to be used in place of that in the defective ROM locations, and an encoder interposed between the decoder and the auxiliary memory for addressing the memory whenever a decoder output is received specifying a ROM location that is to be patched.

Inputs of the PROM decoder and the ROM are both connected to the memory address but of the system of which the ROM is a part. The decoder thereby receives each address word applied to the ROM. The decoder detects the receipt of each word representing a defective ROM location and generates an output signal representing the defective location. This signal is in 1-out-of-n form and it is applied to the one of the plurality of decoder output conductors that is associated with the patched address. Each decoder output conductor represents a different defective ROM location that is to be patched. The encoder receives this 1-out-of-n signal, converts it to binary and transmits the binary information to the auxiliary memory as address information. This information is used with one or more bits of the ROM address word to specify the word location in the auxiliary memory that stores the valid program information that is to be used in place of that in the defective ROM location.

The encoder also generates a gating signal whenever an output signal is received from the decoder. This gating signal inhibits the output of the ROM and activates the output of the auxiliary memory so that the good information stored in the auxiliary memory will be used by the system at this time in place of that defective ROM location.

A copending concurrently filed application in the name of J.C. Moran, Ser. No. 623,133 filed Oct. 16, 1975, discloses a ROM patching arrangement which uses a plurality of small capacity PROMs to decode ROM address information applied to a multiconductor system address bus and to provide a unique output signal for each detected ROM address word associated with a defective ROM location that is to be patched. For example, let it be assumed that there are twelve conductors in the system address bus extending to the inputs of the ROM. In this case, one possible embodiment of the Moran invention could comprise three 16 × 8 PROMs in the decoder to provide eight patches i.e., facilities for detecting eight different ROM address words representing eight defective ROM locations. The term 16 × 8 specifies that each PROM has sixteen different eight bit word locations.

Each such PROM, as shown by Moran, has four address inputs with each input being connected to a different conductor of the 12 bit system address bus. The four inputs of the first PROM are connected to the first four address bus conductors, the four inputs of the second PROM are connected to the next four address bus conductors, and the four inputs of the third PROM are connected to the last four bus conductors. Each PROM stores 8 bit words, each PROM has eight output conductors, and the eight output conductors of each PROM are wired in parallel to the corresponding output conductors of the other PROMs.

PROM 1, the first PROM, is programmed so that a 1 is written into the first or rightmost bit position of the word location in the PROM that is addressed by bits 0 through 3 of the address of the first ROM word to be patched. Likewise, a 1 is written into the first bit position of the word location in PROM 2 that is addressed by bits 4 through 7 of the address of the first ROM word to be patched. This procedure is repeated with respect to PROM 3 using address bits 8 through 11.

The operation of the Moran circuit is such that all PROMs output an 8 bit word having a 1 in the same bit position whenever the address of ROM location to be patched is received from the system address bus. Each output bit corresponds to one possible patch and the paralleled PROM outputs provide a 1-out-of-8 code signal identifying each patch. The paralleled corresponding output conductors of each PROM comprises a hardwired AND circuit so that each paralleled output conductor can go high only when a 1 appears in the corresponding bit position of each PROM for the currently addressed word. With this arrangement, when the first patched ROM address on the system address bus, all three PROM's will have a 1 in the first bit position, the output conductor for this bit position in each PROM will go high, and this high signal will indicate signify the reception of the first patched address word.

Each decoder output signal in the Moran system is applied in 1-out of-8 form to the encoder and converted into a 3-bit binary word. This binary word is then applied as address information to the auxiliary memory to specify the word location in the memory that is to be used at this time in place of the defective information in the ROM.

When a ROM address which has not been patched is received, the paralleled PROM outputs in the Moran system are zero for all bit positions (bit orders) since, at this time, a 1 does not appear in any of the corresponding bit orders for all PROMs. This holds all of the 8 paralleled decoder output conductors at a low or 0 potential and indicates that the received address word has not been patched. The system then uses the information stored in the currently addressed ROM location.

The use of a plurality of PROMs of relatively low capacity, such as three 16 × 8 PROMs as shown by Moran, is economically perferable over the use of a single PROM having a number of inputs equal to the number of conductors in the address bus. The cost of PROMS is related to their bit capacity. A PROM having twelve input conductors would have 4,096 ($2^{12}$) word locations. The use of three small PROMs is cheaper since a PROM having four address conductors will have only 16 ($2^4$) word locations; the three decoder PROMs together will have only 48 word locations. The cost savings for this alternative arrangement is approximately proportional to the number of word locations.

Although the Moran arrangement represents a significant advancement in the art of patching defective ROM locations, the number of patches that it can provide is defined or limited by the number of binary bits (the bit width) in each PROM word location, rather than by the number of word locations in the PROMs. For example, Moran's use fo three 16 × 8 PROMs limits the number of patches to eight since each PROM is eight bits wide.

The present invention provides a ROM patching arrangement which is similar to Moran's but which can provide additional patching capacity with a minimum of device modification. This is accomplished by connecting at least one of the memory address bus conductors to an input of each of the plurality of decoder PROMS as well as to an address input of the auxiliary memory. The connection of a single memory address bus conductor in this manner effectively doubles the patching capacity over that shown by Moran. For example, if PROMs having an eight bit width are used, this expedient provides facilities for sixteen rather than eight output patches. This may be understood by first assuming that the single memory address bus conductor that is connected to all PROMS as well as to an input of the auxiliary memory remains a zero. In this case, the remaining inputs of the PROMs can detect a first set of eight different patched addresses, and the binary zero applied to the auxiliary memory by the memory address bus conductor cooperates with the encoder to provide address information to the auxiliary memory whenever this first set of eight patches are detected. Next let it be assumed that this same memory address bus conductor is a binary 1. The remaining input conductors of the decoder PROMs can now detect a sound set of eight different patched addresses. The binary 1 applied by this address conductor to the auxiliary memory as address information cooperates with the address information generated by the encoder to cause the auxiliary memory to output the system address program information that is to be used at this time.

It has just been discussed how the capacity of the Moran patching arrangement can be increased by extending one memory address bus conductor to an input on each of a plurality of decoder PROMs as well as to an address input of the auxiliary memory. This concept can be extended to more than one memory address conductor in order to provide still greater patching capacity. For example, if two memory address bus conductors are connected to each of the decoder PROM inputs as well as to address inputs of the auxiliary memory, then 8 × 2 × 2 or 32 different patches may be provided. Similarly, if three memory address bus conductors are connected in this manner, then 64 patches may be provided. It may therefore be seen that the patching arrangement of the present invention provides increased patching capacity over that shown by Moran and it does this at a nominal increase in device cost.

FEATURES

A feature of the invention is the provision in a system of a ROM patching facility which uses a plurality of small capacity PROMs to detect address words representing defective ROM address locations with at least one of the conductors of a system address bus being connected to an address input on each of the PROMs as well as to an address input on an auxiliary memory, and with each one of the remainder of the address bus conductors being connected to a different single input on only one of the PROMs.

Another feature is the use of a plurality of small capacity PROMs to detect address words representing defective ROM address locations with the address bus having a plurality of conductors that are connected to different address inputs on the PROMs except that at least one of the conductors is connected to an input on each of the PROMs.

A further feature is the provision of circuitry for paralleling the corresponding output conductors of the plurality of PROMs to provide a distinctive 1-out-of-n type signal whenever an address word is received representing a defective ROM location that is to be patched.

A further feature is the provision of an encoder which is connected to the PROM output conductors, which receives each 1-out-of-n type decoder output signal, and which encodes each such signal into a binary word representing address information for an auxiliary memory.

A further feature is that the auxiliary memory stores the valid program information that is to be used when a defective ROM address word is received and that the auxiliary memory is addressed by the bit information provided to it jointly by the endoder as well as at least one memory address bus conductor.

A further feature is the provision of control circuitry including the encoder which responds to the reception of each decoder output signal and which, at that time, inhibits the output of the defective ROM and substitutes the currently addressed information in the auxiliary memory.

DESCRIPTION OF THE DRAWING

These and other objects, advantages, and features of the invention may be more readily understood upon a reading of the following description of an exemplary embodiment of the invention taken in conjunction with the drawing in which:

FIGS. 4, 5, 6, 7, 8, and 9 together disclose one possible manner in which the decoder PROMs of FIG. 1 could be programmed.

DESCRIPTION

Figure 1:
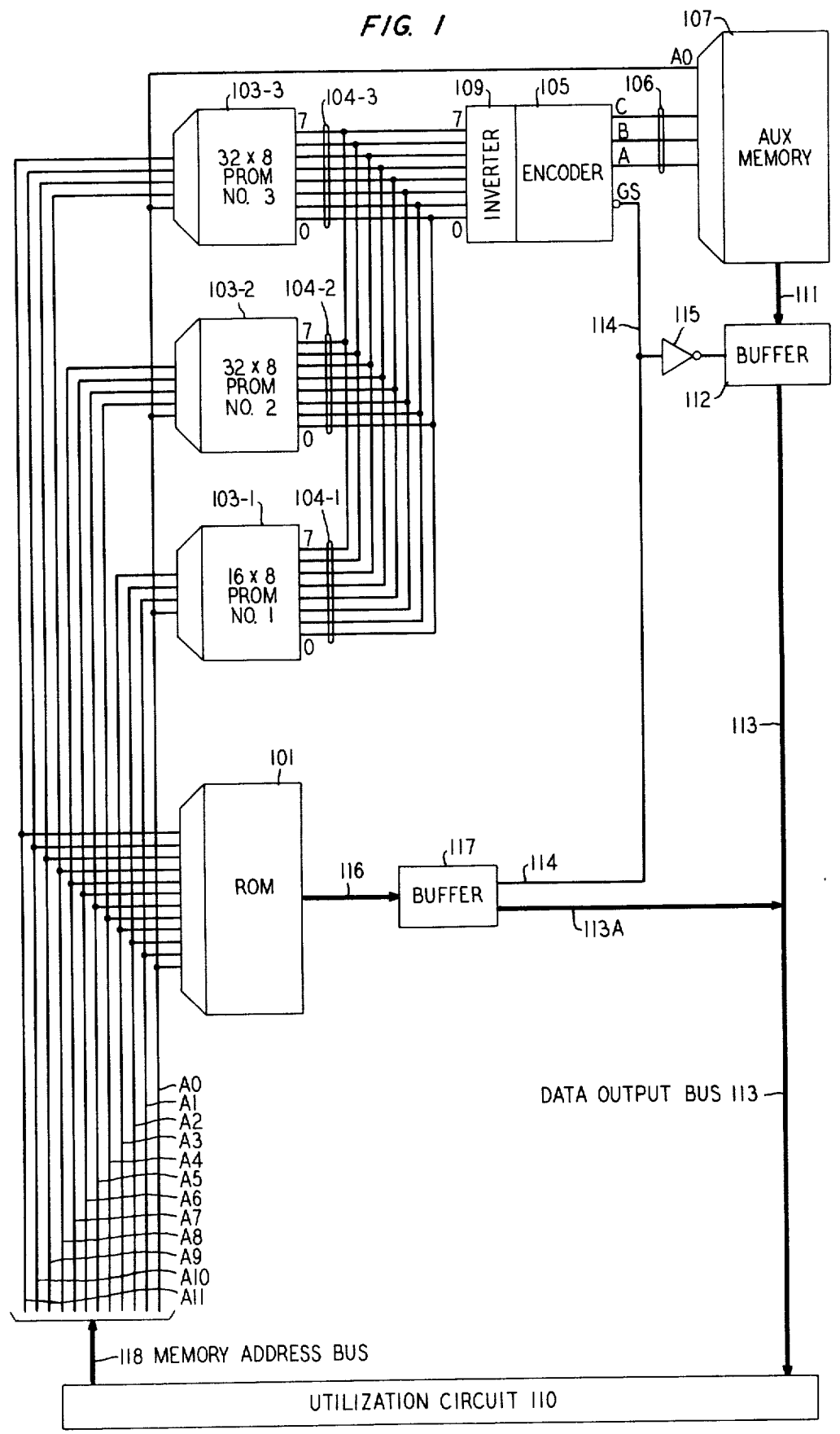
FIG. 1 discloses one possible embodiment of the invention which provides facilities for 16 patches.

A memory system embodying the invention is shown in FIG. 1 as comprising a memory address bus 118, a ROM 101 which is the main memory of the system and which is assumed to have the defective locations that are to be patched, a buffer 117 which recieves the output signals from the ROM, and an output bus 113 which receives the ROM output signal via buffer 117 and extends these signals to the utilization circuit 110. Circuit 110 may comprise the remainder of the system elements, including a processor, that are associated with and/or controlled by the memory system of FIG. 1.

In normal operation, the utilization circuit 110 applies address word infomation to the ROM via the memory address bus 118 and reveives the contents of each word read out of the ROM. This informaion is received from the ROM via path 116, buffer 117, path 113A and the data output bus 113. Buffer 117 is normally enabled by the high on its control conductor 114. During such times, the buffer effectively interconnects paths 116 and 113A signalwise.

The patching facilities provide in accordance with the embodiment of the invention shown on FIG. 1 further include a 16 × 8 PROM 103-1, a 32 × 8 PROM 103-2, another 32 × 8 PROM 103-3, an encoder 105 which includes inverter 109, auxiliary memory 107, and buffer 112. PROM 103-1 has four address inputs and these four inputs are connected to memory address conductors A0 through A3. PROMs 103-2 and 103-3 have five address inputs. The lowermost input of each of these two PROMs is also connected to bus conductor A0. The remaining inputs of PROM 103-2 are connected to bus conductors A4 through A7; the remaining four inputs of PROM 103-3 are connected to bus conductors A8 through A11. Conductor A0 is also connected to an address input of auxiliary memory 107. Each PROM stores 8-bit words, each PROM has eight output conductors designated 0 through 7, the corresponding output conductors of the three PROMs are interconnected in parallel with each other, and they extend to a different input on encoder 105 via inverter 109.

As is subsequently discussed in connection with FIG. 4, 5 and 6, the three PROMs together are programmed to detect two sets of eight different ROM address words on bus 118. The eight words of one set are detected when the binary value of the bit appearing on conductor A0 is a 0. The eight words comprising the other set are detected when the binary value of the A0 bit is a 1. Each of the eight address words within a set is functionally associated with a unique bit order within each of the three PROMs. Each PROM output conductor is also uniquely associated with a unique bit order within its PROM. For example, PROM output conductors 0 are associated with the rightmost, the least significant, bit order so that when a PROM word is read out, the contents of the rightmost bit of the word being read out are applied to output conductors 0.

Each of the output conductors of each PROM is functionally associated with one of the address words of each of the two sets of words on bus 118 that can be patched. Thus, output conductor 0 of each PROM is functionally associated with the first word of each set that is to be patched and a binary 1 is written into the rightmost bit of the word location in each PROM that is accessed when the first patched address of a set appears on bus 118. Consequently, whenever this word is received, a binary 1 is read out of the rightmost bit of each PROM and is applied to its output conductor 0.

The corresponding output conductors of the PROMs are wired in parallel and the internal circuitry of the PROMs is such that a set of paralleled output conductors can go high only when each PROM drives its output conductor of this set high in response to the storage of a binary 1 in the associated bit order of the word being read out. A binary 0 (a low) read out on an output conductor of one PROM will hold the corresponding output conductors of the other two PROMs low even though these other two PROMs currently read out a 1.

In this manner, output conductor 0 of each of the three PROMs is associated with the address of the first ROM word in each of two different sets of words that can be patched. The other seven output conductors of each of the PROMs are associated with seven other ROM words that can be patched in each of two sets. The patching capacity of this arrangement is therefore limited to 16 ROM address words since each PROM can provide eight patches when the binary value of conductor A0 is 0 and eight other patches when the binary value of conductor A0 is a 1.

It can be seen that the three PROMs together generate 1-out of-8 type information as each patched address of either set is received. A given 1-out of -8 signal on any of output conductors 0 through 7 can represent a patched address in either of the two sets of eight words that can be detected by the PROMs. This signal is therefore ambiguous in that it does not uniquely identify which of the two possible ROM words that can be patched have been detected. The encoder receives each decoder output signal, encodes it into binary, and applies the binary information as address bits to the auxiliary memory 107 which may be a PROM. The address bits from the decoder are used by auxiliary memory together with the address bit applied by conductor A0. These four address bits together uniquely identify which of the two possible patched addresses has been detected. These four bits address the word in memory 107 that contains the valid program information that is to be used at this time as a substitute for that in the currently addressed defective ROM location.

The encoder 105 has a GS output terminal which is normally high but which goes low whenever the encoder receives a high from the decoder PROMs on any of its input conductors 0 through 7. The low on terminal GS is applied over conductor 114 to buffer 117 to inhibit it so that the ROM signals to path 116 are not extended via buffer 117 to the data output bus 113. The low on path 114 is inverted by circuit 115 and applied as a high to enable buffer 112. This causes the auxiliary memory output signals on path 111 to be extended through buffer 112 to data output bus 113.

With reference to the above, let it be assumed that the 16th ROM word that can be patched is received from the utilization circuit 110 and applied to address bus 118. The bits of this word specify one of two different locations in each PROM 103 that has a binary 1 stored in its leftmost bit position. Each PROM 103 now reads out a binary 1 to dirve its output conductor 7 high. The encoder receives this high on its input conductor 7 and encodes it into a binary 7. This binary 7 is applied via conductors 106 to the auxiliary memory 107 which now also receives a binary 1 on conductor A0. The four binary 1s provided by the encoder 105 and conductor A0 together access the word location in memory 107 that currently stores the good information the utilization circuit 110 requires at this time in place of that in the defective location of ROM memory 101.

The 8th ROM word to be patched is detected under conditions during which the conductor A0 bit is a 0 and the remaining A- conductor bits address a word in each PROM 103 that has a 1 stored in its leftmost bit position.

The encoder receives each decoder output signal and applies a low to conductor 114 to disable buffer 117 and enable buffer 112. This causes the information currently being read out of the auxiliary memory 107 under control of the encoder output to be applied to data output bus 113 and extended to the utilization circuit 103 in place of the defective information in the ROM.

Figure 2:
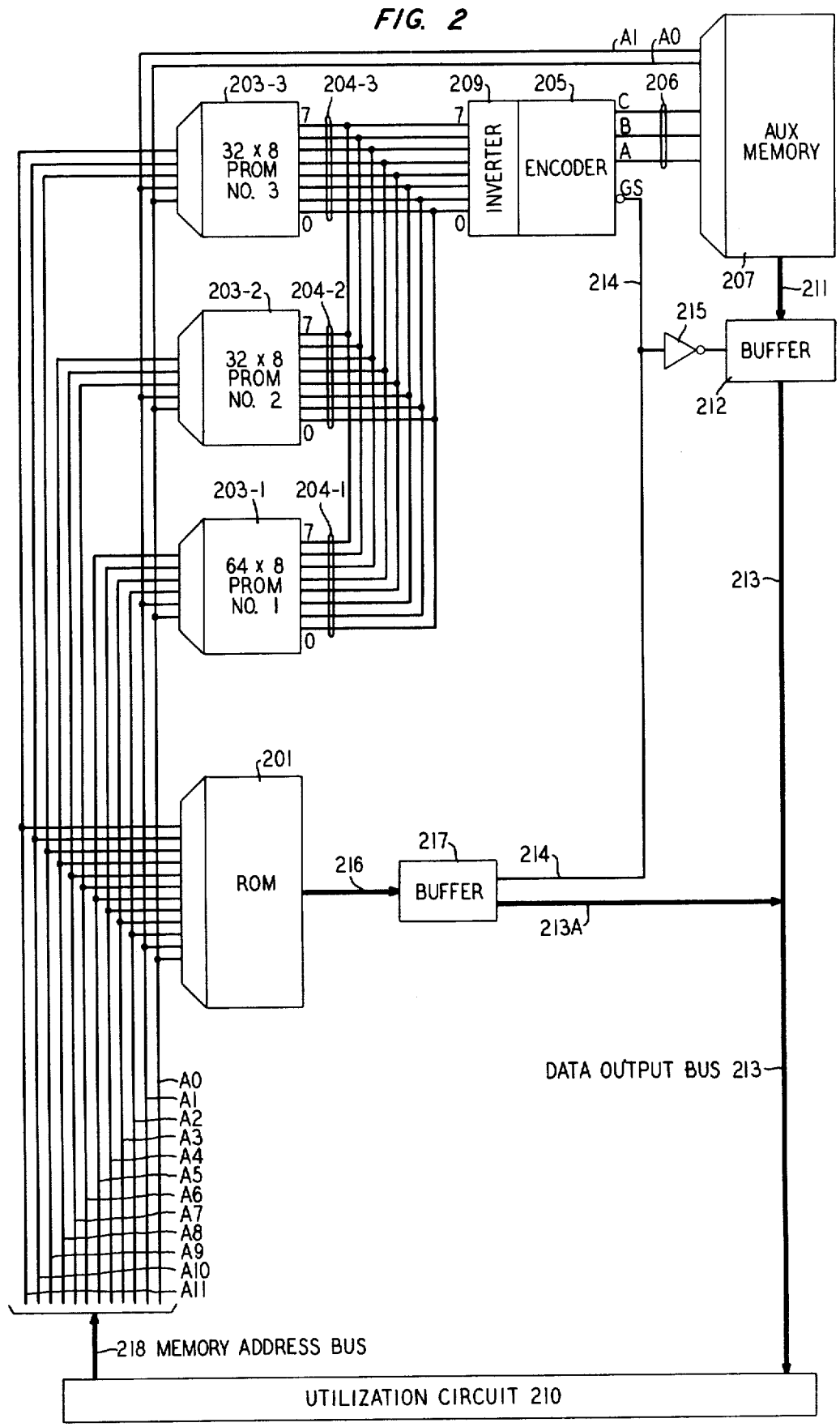
FIGS. 2 and 3 disclose other possible embodiments which provide facilities for 32 and 64 patches, respectively.

FIG. 2 discloses an embodiment of the invention which is similar to that of FIG. 1 but which doubles the number of patches that can be provided. The circuit elements on FIG. 2 correspond to those on FIG. 1 and each element is numbered in a manner to indicate the correspondence. Thus, ROM memory 201 on FIG. 2 corresponds to element 101 on FIG. 1; the auxiliary memory 207 on FIG. 2 corresponds to element 107 on FIG. 1; etc.

The circuitry and operation of FIG. 2 is similar to that of FIG. 1 with the execption that two memory address bus conductors, namely A0 and A1, are connected to two inputs on each of the three PROMs as well as to address inputs of the auxiliary memory 207. PROM 203-1 is a 64 × 8 type PROM; PROMs 203-2 and 203-3 are 32 × 8 type PROMs.

Conductors A0 and A1 together can assume four different binary states namely 00, 01, 10, and 11. The remaining A- conductors are connected to the three PROMs so that eight different patches can be provided for each of the four states of conductors A0 and A1. Thus, four different sets of eight words each can be patched by the embodiment of FIG. 2. The address information provided by the encoder to the auxiliary memory indicates which word within a set is detected; the two address bits provided to the auxiliary memory by conductor A0 and A1 identify the particular one of the four sets in which the patched word is located. Thus, the address information provided by the encoder and conductors A0 and A1 together uniquely identify each of the 32 patches that can be detected by the embodiment of FIG. 2.

Figure 3:
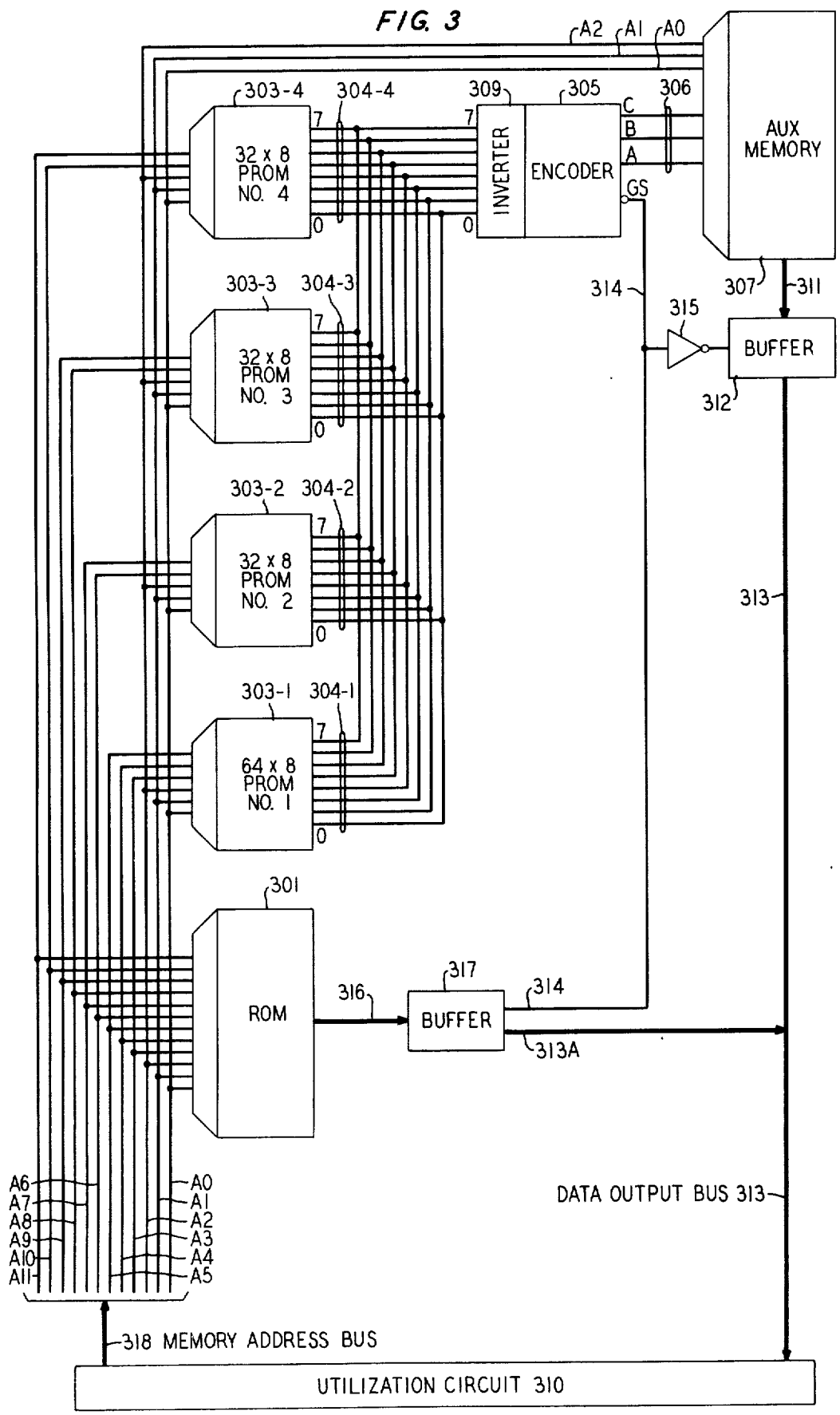

FIG. 3 is similar to FIG. 2 and the elements on FIG. 3 that correspond to those on FIG. 1 and 2 are numbered in a manner to indicate the correspondence. The embodiment of FIG. 3 can provide for up to 64 patches and four PROMs 303 are required to detect the 64 possible word locations of ROM memory 301 that are to be patched. PROM 303-1 is of the 64 × 8 type; the remaining PROMs are of the 32 × 8 type. Conductors A0, A1, an A2 of the memory address bus 318 are connected to separate address inputs on each of the four PROMs as well as to three separate address inputs of auxiliary memory 307. The connection of conductors Ao, A1, and A2 in this manner permits the PROMs to detect eight different ROM addresses in each of eight different sets. The eight different sets are defined by the eight possible binary states of conductors A0, A1, and A2. The identity of each word within a set is defined by the remaining A- address bus conductors.

Conductors A0, A1, and A2 and the encoder output together provide the address information required by the auxiliary memory to uniquely identify each of the 64 patches. The address information provided by the encoder ientifies whih word within a set has been detected; the address bits provided by conductors A0, A1, and A2 identify the particular one of eight sets in which the detected word is located.

FIG. 4, 5 and 6 together illustrate one possible manner in which the three PROMs 103- could be programmed to provide a first set of eight different patches. FIG. 4, 5 and 6 pertain to PROMs 1, 2 and 3, respectively. The left column of each FIG. specifies the patch number, the middle column indicates the address bus bits received by each PROM for each patch, the right column indicates the manner in which the PROMs are programmed to generate the eight patch signals.

With reference to FIG. 4, which illustrates the programming for PROM 1, it can be seen that the PROM 1 location associated with patch 0 is accessed upon the receipt of the binary bits 0010. From the right column of FIG. 4 it can be seen that a binary 1 is written in the rightmost bit position of this word. On FIG. 5 it can be seen that the PROM 2 location associated with patch 0 is accessed by the bits 00100 and that a binary 1 is stored in the rightmost bit position of this word. On FIG. 6 it can be seen that the PROM 3 word associated with patch 0 is accessed by the address bits 01000 and that a binary 1 is stored in the rightmost bit of this word. A binary 1 is applied by each PROM to its output conductor 0 when the address bits for patch 0 are received by the three PROMs. This drives the paralleled output conductors 0 high, and this high extends into input conductor 0 of the priority encoder where it is encoded into binary and subsequently used as address information by auxiliary memory 107.

The remaining lines of FIG. 4, 5 and 6 illustrate the manner in which the PROMs are programmed to generate patch information for other defective ROM address locations.

A PROM location may be programmed to have a binary 1 in a plurality of bit positions if the address bits that access this PROM word are associated with a plurality of ROM address to be patched. This is illustrated on FIG. 4 for patches 2 and 3. The address bits received by PROM 1 for both of these patches is 1000 and a binary 1 is written into bit positions 2 and 3 of the PROM location accessed by bits 1000. The address bits applied to PROMs 2 an 3 are different for patches 2 and 3 and, therefore, different ROM word locations are patches even though the same four bits (AO –A3) are applied to PROM for both patches.

It should be noted that the A0 bit is applied as address information to each of the three PROMs and tht this bit is a 0 for all eight patches of the first set as shown on FIG. 4, 5, and 6. When a ROM address associated with one of the first eight patches is received, each of the three PROMs applies a high, a binary 1, to the one of its ouput conductors that is associated with this particular patch. Since each of the three PROMs are programmed to have a 1 in the corresponding bit order for each patch, all three PROMs drive their corresponding output conductors high, these output conductors are paralleled, and this high is extended to the encoder as a 1-out of -8 signal where it is converted into 3-bit binary information for the auxiliary memory. The A0 conductor at this time applies a binary 0 as another bit of address information to the auxiliary memoy. The single binary bit supplied by the A0 conductor and the three binary bits supplied by encoder output conductors 106 uniquely define the word location in the auxiliary memoy that contains the good program information the system is to use at this time in place of that in the defective ROM location being patched.

FIG. 7, 8 and 9 are similar to FIG. 4, 5, and 6 except that they illustrate the programming of PROMs 1, 2 and 3 and the address bits applied to these PROMs for the second set of eight patches, patches 8 through 15, that the embodiment of FIG. 1 can detect.

The leftmost column on each of these figures identifies tha patch number; the middle column identifies the address bits applied to the PROMs for each patch; the rightmost column illustrates the manner in which the PROMs are programmed for these patches.

Is should be noted that the A0 address bit is applied to all three PROMs and that this bit is a one for all of patches 8 through 15. This binary 1 on conductor A0 is also applied to the auxiliary memory where it cooperates with the encoder output to uniquely define each auxiliary memory location associated with patches 8 through 15.

The PROM programming illustrated in FIG. 4 through 9 is merely illustrative of the capabilities of the emobidment of the invention of FIG. 1. It should be readily appreciated that the PROMs may be programmed in any manner desired to detect the receipt of 16 different ROM address locations containing defective information.

The manner in which the PROMs of FIG. 2 and 3 would be programmed to detect 32 and 62 patches, respectively, is not shown on the drawing since it is merely an extension of that shown on FIG. 4 through 9 for the 16 patches provided by the embodiment of FIG. 1.

The embodiment of FIG. 2 can detect four different sets of 8 patches each for a total of 32 patches. Each of the PROMs would be programmed to have a 1 in the least significant or bit order or position of the first patched word within each of the four sets. Similarly, each PROM would be programmed to have a 1 in the 1 bit order for the next patch, a 1 in the 2 bit order for the third patch, etc., up to and including a 1 in the 7th bit order for the last patch of each set. With the exception of the A0 and A1 bits, the particular address bits that are applied to each PROM are immaterial and would depend upon the address of the defective ROM locations that are to be patched. The A0 and A1 bits are applied to all PROMs as well as to the auxiliary memory; they would be 00 for all patches of the first set, 01 for all patches of the second set, 10 for all patches of the third set, and 11 for all patches of the fourth set. The A0 and A1 bits and the 3 bits from the encoder are applied to the auxiliary memory to uniquely identify the location within the auxiliary memory that contains the good program information that is to be used in place of that in each defective ROM location being patched.

FIG. 3 is merely an extension of FIG. 2 and it provides for eight sets of 8 patches each. The PROMs are programmed to apply a binary 1 to the 0 output conductor upon the detection of the first patch within a set, and similarly for the remaining patches of a set up to and including the 8th patch in whih case the PROMs each apply a binary 1 to output conductor 7. With the exception of the A0, A1, and A2 bits, the address bits app!:ed to the PROMs for each patch are immaterial and depend solely upon the address of the ROM location to be patched. The A0, A1, and A2 bits are 000 for all patches of the first set, 001 for all patches of the second set, and so on for the remaining sets of patches up to and including the 8th the set in which case these bits are 111.

The three PROMs 103-, 203-, and 303- and the auxiliary memory 107, 207, and 307 may be IM5160 type devices and they are field programmable. The encoder 105, 205, and 305 may be a TI SN 74148 type device. The inverter 109, 209, 309 may be a SN 7406 device.

The PROMs apply a high potential to their output conductors to indicate an active state, the encoder responds to a low as an active signal. In order to make the PROMs and the encoder compatible, the inverter 109 is shown and its sole function is to invert the highs representing active ouput PROM signals to the lows required by the encoder. The inverter may be TI SN 7406 type device. This inverter is shown as part of the encoder since it is of no significance to the present invention other than to make the PROM output signals compatible with the encoder.

What is claimed is:

1. A circuit for patching defective word locations of an unalterable memory containing invalid information with said circuit being responsive to the receipt of ROM address words specifying said defective locations, said circuit comprising; a plurality of alterable mmemories having address inputs, means for applying n bits of said address words to n different inputs on said PROMs taken collectively, means for applying each one of the remainder of the bits of said address words to a different input of each one of said PROMs, a plurality of output conductors on said PROMs each of which corresponds to a different bit order within a PROM, means for connecting in parallel the output conductors representing corresponding bit orders for each of said PROMs, means in said PROMs for uniquely associating each set of paralled output conductors with a unique combination of said defective locations with each location being associated with only a single set, said PROMs being responsive to the receipt of an address word specifying a defective ROM location to apply a path signal to the one set of said output conductors associated with said specified location, an auxiliary memory, encoder means responsive to said patch signal for applying encoded address information to said auxiliary memory, and means for applying said remainder of said address bits for said specified location to said auxiliary memory, said auxiliary memory being responsive to the concurrent receipt of said encoded address information and said remainder of said address bits for generating valid program information as a substitute for that stored in said specified defective ROM location.

2. The circuit of claim 1 in combination with; means for applying each address word to said ROM to read out the ROM program information associated with each applied word, means for normally applying the program information read out of said ROM to a data output bus, means responsive to said patch signal for applying the program information generated by said auxiliary memory to said data output bus, and further means responsive to said patch signal for preventing said ROM from applying to said output bus the invalid program information in the currently addressed one of said defective ROM locations.

3. A circuit for patching $j2^{m2}$ defective word locations of an unalterable memory containing invalid information with said circuit being responsive to the receipt of ROM address words specifying said defective locations and with each word having $m\ 1 + m\ 2$ bits, said circuit comprisng; a plurality of alterable memories having address inputs, means for applying $m\ 1$ bits of each of said address words to m1 different inputs on said PROMs taken collectively whereby each of said $m\ 1$ bits is applied only to a single input of a single PROM, means for applying each one of said $m\ 2$ bits of said address words to a different input on each of said PROMs whereby each of said $m\ 2$ bits is applied to all PROMs, $j$ output conductors on each of said PROMs with each conductor corresponding to a different bit order within a PROM, means for forming $j$ sets of output conductors by connecting in parallel the output conductors representing corresponding bit order for each of said PROMs, means in said PROMs for uniquely associating each set of said pralleled output conductors with a unique combination of $2^{m2}$ different ones of said defective locations with each location being associated with only a single set, said PROMs together being responsive to the receipt of an address word specifying a defective ROM location to apply a patch signal to the set of said output conductors associated with said specified location, an auxiliary memory, encoder means responsive to said patch signal for applying encoded address information to said auxiliary memory, and means for applying said $m\ 2$ bits of the address word for said specified location to said auxiliary memory, said auxiliary memory being responsive to the concurrent receipt of said encoded address information and to said $m\ 2$ bits for generating valid program information as a substitute for that stored in said specified defective memory location.

4. The combination of an unalterable memory having up to $j2^{m2}$ different defective word locations containing invalid program information, and a circuit for patching up to $j\ 2^{m2}$ different ones of said defective locations to provide valid program information in response to the receipt of ROM address words specifying said defective locations, said combination comprising; an address bus having at least $m\ 1 + m\ 2$ conductors which are connected to address inputs of said ROM, control means for applying address words to said bus representing location of said ROM containing program information that is to be read out, means for receiving the program information read out of each ROM location upon the reception of an address word and for normally extending said information over an output bus to said control means, a plurality of alternable memories each having address inputs, means for connecting $m1$ conductors of said address bus to $m1$ different inputs on said PROMs whereby each bus conductor is connected to a single input of a single PROM, means for connecting $m\,2$ conductors of said address bus to $m\,2$ different inputs on each PROM whereby each of said $m\,2$ conductors is connected to all PROMs, $j$ output conductors on each of said PROMs each of which corresponds to a different bit order within a PROM, means for forming $j$ sets of output conductors by connecting in parallel the output conductors representing corresponding PROM bit orders for each ocf said PROMs, means in said PROMs for uniquely associating each set of said paralleled output conductors with a unique combination of said ROM address words representating different defective ROM locations, said PROMs together being responsive to the receipt of an address word specifying a defecive ROM location to apply a patch signal to the set of said paralleled output conductors associated with said specified location, encoder means responsive to said path signal application for generating encoded binary address information, an auxiliary memory and means for applying said encoded address information and said $m2$ address bits for said specified defective location to said auxiliary memory, said auxiliary memory being responsive to the reception of said address information and said $m2$ bits for generating valid program information as a substitute for that in said specified defective ROM location.

5. The combination of claim 4 wherein said combination further comprises; means responsiive to said patch signal for applying the output information from said auxiliary memory over said output bus extending to said control means, and further means responsive to said patch signal for preventing said ROM from applying to said output bus the invalid information in said currently addressed defective location.

6. A circuit for detecting the receipt of $j2^{m2}$ different address words each having $m1 + m2$ bits, said circuit comprising; a plurality of alterable memories, address inputs on said PROMs, $j$ output conductors on each of said PROMs each of which is unique to a different bit order within said PROMs, means for forming $j$ sets of output conductors by connecting in parallel the output conductors representing corresponding bit orders for each of said PROMs, means in said PROMs for uniquely associating each set of said paralleled output conductors with a unique combination of 2 m2 of said address words, means for applying $m1$ bits of each address word to different inputs on said PROMs with each of said $m1$ bits being applied to only a single input of a single PROM, and means for applying each one of said $m2$ bits to a different input on each PROM with each of said $m2$ bits being applied to all PROMs, said PROMs being jointly responsive to each receipt of any one of said $j2^{m2}$ address words to apply a patch signal to the set of paralleled output conductors associated with said one address word.

7. The method of patching defective word locations containing invalid information in an unalterable memory upon the receipt of ROM address words specifying said defective locations, said method comprising the steps of;
receiving address words with each word having $m1 + m2$ bits,
applying $m1$ bits of each word to $m1$ different inputs on a plurality of alterable memories with each one of said $m1$ bits being applied to only a single input of a single PROM,
applying $m2$ bits of each address word to $m2$ different inputs on each PROM with each $m2$bit being applied to an input on every PROM,
connecting in parallel the PROM output conductors representating corresponding bit orders in each of said PROMs,
programming said PROMs to associate each set of said paralleled output conductors with a unique combination of said address words representating different defective ROM locations, said programmed PROMs together being responsive to the receipt of an address word specifying one of said defective ROM locations to apply a patch signal to the set of said output conductors associated with said one specified location.
encoding each applied patch signal into address information for an auxiliary memory,
applying said encoded address information and said $m2$ bits of said address word for said specified location to said auxiliary memory, and
controlling said auxiliary memory with said encoded address information together with said m2 address bits to generate valid program information as a substitute for that stored in said specified defective ROM location.

8. The method of claim 7 in combination with the additional steps of;
applying all bits of each of said address words to said ROM,
reading program information out of said ROM upon the receipt of each address word,
normally applying the program information read out of said ROM to a data output bus extending a system control,
isolating said ROM from said output bus upon the generation of said patch signal to prevent the invalid program information read out of said specified defective ROM location from being applied to said output bus, and
applying to said output bus under control of said patch signal the valid program information generated by said auxiliary memory.

9. A method of operating a memory system with said method comprising the steps of;
applying address words having $m1 + m2$ bits to an addres bus with said words representing unalterable memory locations containing program information that is to be read out of said ROM, some but not all of said words representing defective ROM locations containing invalid information,
reading program information out of said ROM upon the reception of each address word,
extending the program information read out of said ROM over a data output bus to a system control,
applying $m1$ bits of each address word to $m1$ different inputs on a plurality of alterable memories with each one of said $m1$ bits being applied to only a single input of a single PROM,
applying $m2$ bits of each address word to $m2$ different inputs on each PROM with each m2 bit being applied to every PROM,
forming $j$ sets of PROM output conductors by connecting in parallel the PROM output conductors representing correspondng bit orders in each of said PROMs, programming said PROMs to associate each set of said paralleled output conductors with a unique combination of up to $2^{m2}$ ROM address words representating different defective ROM locations, said programmed PROMs being responsive to the receipt of an address word specifying a defective ROM location to apply a patch signal to the one set of said output conductors associated with said specified location, encoding each patch signal into binary address information, applying said binary address information and sadi $m2$ address bits for said specified defective location to an auxiliary memory, generating valid program information as a substitute for that stored in said specified defective ROM location upon the receipt of said binary address information and said $m2$ address bits by said auxiliary memory, isolating said ROM from said output bus under control of said patch signal so that the information read out of said ROM upon the receipt of said address word specifying a defective location is not applied to said output bus, and applying over said output bus to said system control the valid information generated by said auxiliary memory upon the receipt of said encoded binary address information and said $m2$ bits by said auxiliary memory.

* * * * *